(12) United States Patent
Shelor (10) Patent No.: US 7,350,059 B2
(45) Date of Patent: Mar. 25, 2008

(54) MANAGING STACK TRANSFERS IN A REGISTER-BASED PROCESSOR

(75) Inventor: Charles F. Shelor, Arlington, TX (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 281 days.

(21) Appl. No.: 10/851,929

(22) Filed: May 21, 2004

(65) Prior Publication Data

US 2005/0262303 A1 Nov. 24, 2005

(51) Int. Cl.
*G06F 15/00* (2006.01)

(52) U.S. Cl. .................................. 712/225; 712/202

(58) Field of Classification Search ................ 712/225, 712/220, 202
See application file for complete search history.

(56) References Cited

U.S. PATENT DOCUMENTS

| | | | | |
|---|---|---|---|---|
| 4,517,640 | A * | 5/1985 | Hattori et al. ............... | 711/126 |
| 5,551,054 | A * | 8/1996 | Packer ........................ | 710/23 |
| 5,659,703 | A * | 8/1997 | Moore et al. ............... | 711/109 |
| 5,953,741 | A | 9/1999 | Evoy et al. .................. | 711/132 |
| 6,021,469 | A | 2/2000 | Tremblay et al. ........... | 711/125 |
| 6,026,485 | A | 2/2000 | O'Connor et al. .......... | 712/226 |
| 6,038,643 | A | 3/2000 | Tremblay et al. ........... | 711/132 |
| 6,289,418 | B1 | 9/2001 | Koppala ..................... | 711/132 |
| 6,363,473 | B1 * | 3/2002 | Volentine et al. ........... | 712/202 |
| 2003/0161302 | A1 * | 8/2003 | Zimmermann et al. ..... | 370/363 |
| 2003/0177328 | A1 | 9/2003 | Naganuma et al. ......... | 711/170 |
| 2003/0188128 | A1 | 10/2003 | Francis ....................... | 712/202 |
| 2004/0078550 | A1 * | 4/2004 | Chauvel et al. ............. | 712/34 |
| 2004/0236926 | A1 | 11/2004 | Tran et al. | |

OTHER PUBLICATIONS

"Are Java Chips Better Than General-Purpose CPUs? Or Will New Compilers Make Them Obsolete?" Byte.com; Nov. 1996.
"Java Design Aspects" Ahmed El-Mahdy.
"Jazelle™—ARM® Architecture Extensions for Java Applications" ARM Inc.; Mar. 2001.

* cited by examiner

*Primary Examiner*—Tonia L M Dollinger
(74) *Attorney, Agent, or Firm*—Thomas, Kayden, Horstemeyer & Risley (57) ABSTRACT

The present invention is generally directed to a method and apparatus for emulating a portion of a stack. Certain embodiments of the invention manage data transfers between processor registers that are configured to emulate a top portion of a stack and memory, which contains, the remainder of the stack. Some embodiments utilize a variable buffer that is configured to buffer transfers between the processor registers and the memory. The actual amount of data stored in the variable buffer is configured to be flexible, so that transfers between the variable buffer and processor registers are managed to keep the processor registers filled with active stack data (assuming that stack data exists). However, transfers between the variable buffer and memory may be configured to occur only when the variable buffer exceeds certain fill capacities.

20 Claims, 5 Drawing Sheets

MANAGING STACK TRANSFERS IN A REGISTER-BASED PROCESSOR

FIELD OF THE INVENTION

The present invention generally relates to processors, and more particularly to an apparatus and method for managing stack transfers between memory and processor registers that are configured to emulate a portion of a memory stack.

BACKGROUND

Processors (e.g., microprocessors) are well known and used in a wide variety of products and applications, from desktop computers to portable electronic devices, such as cellular phones and PDAs (personal digital assistants). As is known, some processors are extremely powerful (e.g., processors in high-end computer workstations), while other processors have a simpler design, for lower-end, less expensive applications and products.

Platform-independent programming languages, such as the "Java" programming language from Sun Microsystems, Inc., offer different structural and operational features than traditional, platform-specific languages. A platform-independent programming language typically utilizes platform-independent program code (machine-readable instructions) suitable for execution on multiple hardware platforms without regard for the particular instruction set for the hardware platforms. A hardware platform typically includes a computer system having one or more processors (e.g., microprocessors or microcontrollers) which execute a particular set of instructions having a specific format, sometimes referred to as a native instruction set. This is in contrast to platform-specific languages, which utilize platform-specific compilers to generate program code that is native to one particular hardware platform. While the same source code may in some instances be compiled by different platform-specific compilers into suitable program code for multiple platforms, the resulting program code is not platform-independent.

One class of instruction sets includes those instruction sets that use a stack-based approach to storing and manipulating data items upon which they act. The stack within a data processing system supporting such a stack-based instruction set may store a sequence of data items, for example operand values, that are placed into the stack in a particular order and then removed from the stack in the reverse of that order. Thus, the last data item to be placed into the stack will also typically be the first data item to be removed from the stack. Stack-based processors may provide a stack consisting of a plurality of addressable stack entries to which data items may be written and from which data items may be read in conjunction with a stack pointer which indicates the current "top" position within the stack. The stack pointer specifies a reference point within the stack memory which identifies the latest data item to be stored into the stack and from which other accesses to the stack may be referenced.

One example of a stack-based instruction set is the Java Virtual Machine instruction set, as specified by Sun Microsystems Inc. The Java programming language seeks to provide an environment in which computer software written in Java can be executed upon many different processing hardware platforms without having to alter the Java software.

Another class of instruction sets includes those instruction sets that use a register-based approach to storing and manipulating the data items upon which they act. An example of such register-based systems are the ARM processors produced by ARM Limited of Cambridge, England. ARM instructions execute operations (such as mathematical manipulations, loads, stores, etc) upon operands stored within registers of the processor specified by register fields within the instructions.

Certain data processing systems designed to execute register-based instructions are known to also support execution of stack-based instructions. In such systems, stack-based instructions are converted into a sequence of operations to be executed by the processor core using registers within a register bank or register set. The data items on the stack that are required by those operations are stored from the stack into registers of the register bank so that they are available to the processor core. Typically, a set of registers within the register bank are allocated to hold stack data items (also referred to herein as stack operands) from a portion of the stack. A plurality of different mapping states may be provided in which different registers within the set hold respective stack operands from different positions within the portion of the stack. The mapping state may be changed in dependence upon operations that add or remove stack operands held within the set of registers used for the stack in a manner that provides a function similar to that of a stack pointer within a stack. Such an approach seeks to reduce the processing overhead required to provide stack-like storage within the registers of a register-based processor.

In such a system, the stack entries in the stack may be considered to be of a fixed size, and each register in the set of registers allocated to hold stack operands may be arranged to only store the data corresponding to one stack entry. However, the registers of the processor core that may be devoted to the storage of stack operands may be limited by the need to provide other registers for functions such as the management of the decoding of the stack-based instructions into operations to be executed within the register-based processor, and for the emulation of other control values, such as a variables pointer or a constant pool pointer, that may be found in a stack-based processing system. This means that situations may arise where stack operands held within the set of registers may need to be moved back to the stack (in memory) to provide room for new stack operands to be placed within the set of registers.

Known systems that use registers to implement a portion of a memory stack realize certain efficiency gains over traditional use of memory stacks, as movement of data among processor registers is faster than movement of data between registers and memory. However, the known implementations suffer various shortcomings. One shortcoming is manifest once the stack has overfilled the registers. After the stack registers have been filled, further pushes and pops from the stack result in excessive reads and writes from external memory (one for each PUSH or pop), resulting in increased memory traffic and excessive power consumption. Particularly in portable (e.g, battery-operated) devices, there is a significant desire to improve power consumption where possible.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve certain advantages and novel features, the present invention is generally directed to method and apparatus for emulating a portion of a stack. Certain embodiments of the invention manage data transfers between processor registers that are configured to emulate a top portion of a stack and memory, which contains the remainder of the stack. Some embodiments utilize a variable buffer that is configured to buffer transfers between the processor registers and the memory. The actual amount of data stored in the variable buffer is configured to be flexible, so that transfers between the variable buffer and processor registers are managed to keep the processor registers filled with active stack data (assuming that stack data exists). However, transfers between the variable buffer and memory may be configured to occur only when the variable buffer exceeds certain fill capacities.

Specifically, stack data is read from the memory into the variable buffer if the number of stack data items in the variable buffer is below a first predetermined amount, and stack data is written from the variable buffer to the memory if the number of stack data items in the variable is above a second predetermined amount.

Embodiments of the invention also provide methods for managing transfers of stack data between processor registers and a memory.

DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

It is noted that the drawings presented herein have been provided to illustrate certain features and aspects of embodiments of the invention. It will be appreciated from the description provided herein that a variety of alternative embodiments and implementations may be realized, consistent with the scope and spirit of the present invention.

Figure 1A:
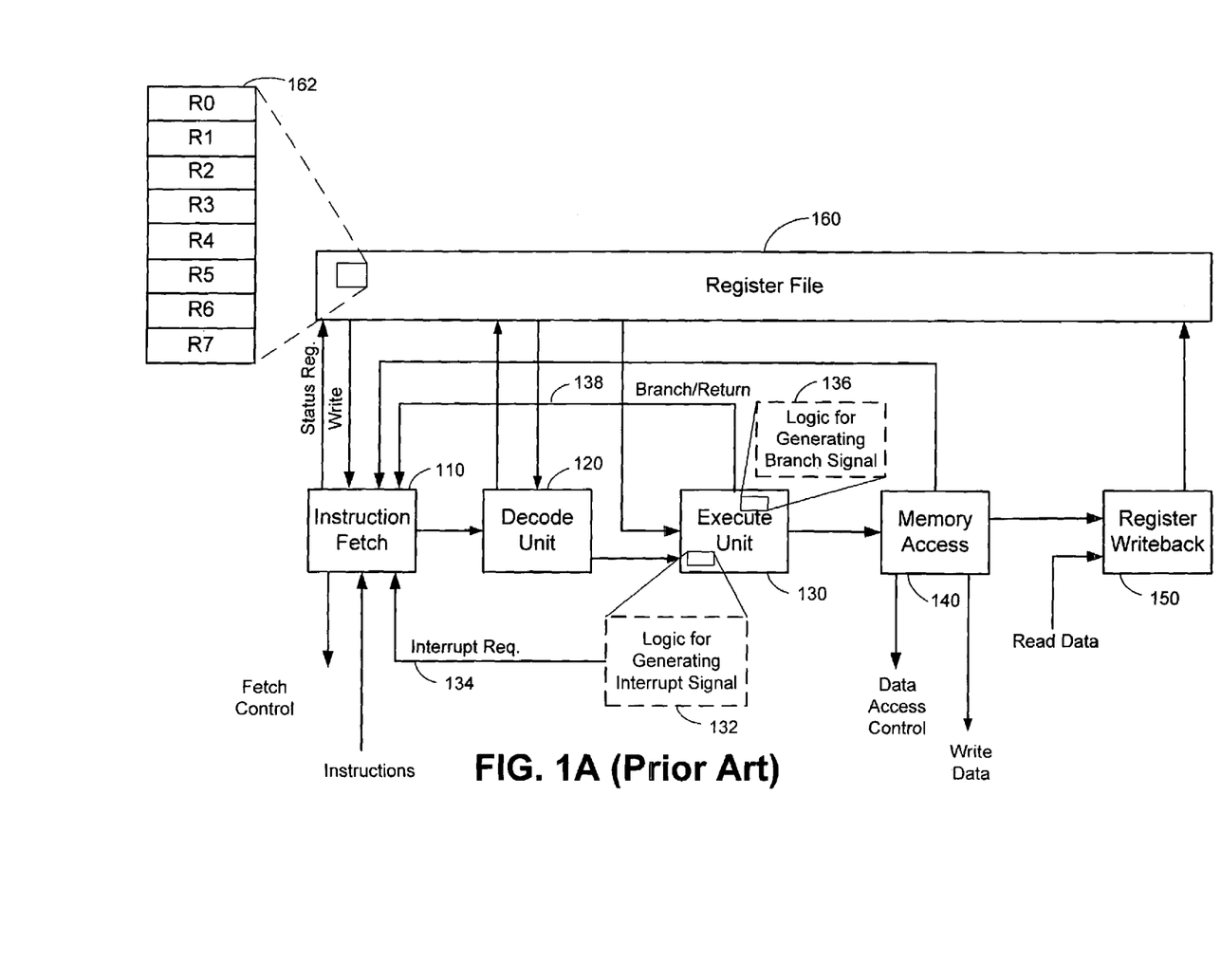
FIG. 1A is a block diagram illustrating certain processing stages within a pipelined processor, as is known in the prior art.

Referring to FIG. 1A, a block diagram depicts a five stage pipeline processor architecture for executing instructions. Alternative pipeline architectures, having more or fewer pipeline stages and/or differing configurations, may be implemented consistent with concepts and teachings of the present invention. In the architecture of FIG. 1A, illustrated are an instruction fetch unit 110, a decode unit 120, an execute unit 130, a memory access unit 140, and a register writeback unit 150. Except as otherwise described herein, the operation of these units (or logic blocks) is conventional, known by persons skilled in the art, and need not be further described herein.

As is known, an instruction fetch unit 110 performs instruction memory fetches. This unit is configured to determine the value or contents of a program counter (within the register file 160) for in-order instruction execution, as well as exception vectors, branches, and returns. The instruction fetch unit 110 is also configured to determine the return address for all exceptions and branch-link instructions, and write or store that return address into an appropriate register within the register file 160. Addressing of instruction fetches may be through physical addresses directly to memory, or through an instruction cache (not shown) using physical or virtual addresses. Although the internal architecture of the register file 160 is not shown, the register file 160 includes various registers utilized by the processor. As is known, such registers may include general-purpose registers or special-purpose registers (such as status registers, a program counter, etc.). Further, the registers within the register file 160 may be banked or unbanked. As is known, an unbanked register refers to a single physical register that is available in all processor modes of operation. Typically, unbanked registers are completely general-purpose, having no special uses implied by the architecture. Of course, it would be up to the programmer to ensure that the contents of these registers are saved (e.g., pushed to a stack) when changing modes of operation (or when processing branch routines or other subroutines), and restored when returning from a changed mode of operation.

In this regard, the register file 160 may contain a plurality of registers 162 (denoted R0 through R7 in this example) along with a plurality of other registers (not specifically shown), which carry out conventional processor register functions and operations. The registers 162 are configured and controlled to emulate a plurality (in this example 8) of memory locations located at the top of the stack. In essence, registers R0 through R7 retain the top eight data items of the memory stack. Additional discussion will be provided as to the flow and operation of these registers 162 in connection with FIG. 1B.

The decode unit 120 operates to decode instructions passed to it from the instruction fetch unit 110 and generate the necessary control signals for the execute unit 130 to carry out the execution of the particular instruction. The specific architecture of the decode unit 120 is processor dependent, but the general operation and organization of such will be understood by persons skilled in the art. Likewise, the structure and operation of the execute unit 130 is processor dependent, but will be understood by persons skilled in the art. Generally, an execute unit includes circuitry to carry out the execution of instructions as determined by the control signals generated from the decode unit 120.

As illustrated in FIG. 1A, the execute unit 130 of the illustrated embodiment may include logic 132 for generating one or more interrupt signals 134, as well as logic 136 for generating one or more branch signals 138. As the names imply, the interrupt signal 134 indicates an interrupt condition (e.g., IRQ, FIRQ, etc.). Likewise, the branch signal 138 indicates a branch condition (or may also indicate a return from a branch). Indirectly, these signals indicate ensuing out-of-order instructions.

The memory access unit 140 interfaces with external data memory for reading and writing data in response to the instruction being executed by the execute unit 130. Of course, not all instructions require memory accesses, but for those that do, the memory access unit 140 carries out the requisite access to external memory. Such memory access may be direct, or may be made through a data cache using either physical or virtual addressing.

Finally, the register writeback unit 150 is responsible for storing or writing contents (resulting from instruction execution), where appropriate, into registers within the register file 160. For example, consider the execution of an instruction that adds the contents of two general-purpose registers and stores the contents of that addition into a third general-purpose register. After execution of such an instruction, the register writeback unit 150 causes the value obtained in the summation to be written into the third general-purpose register.

Figure 1B:
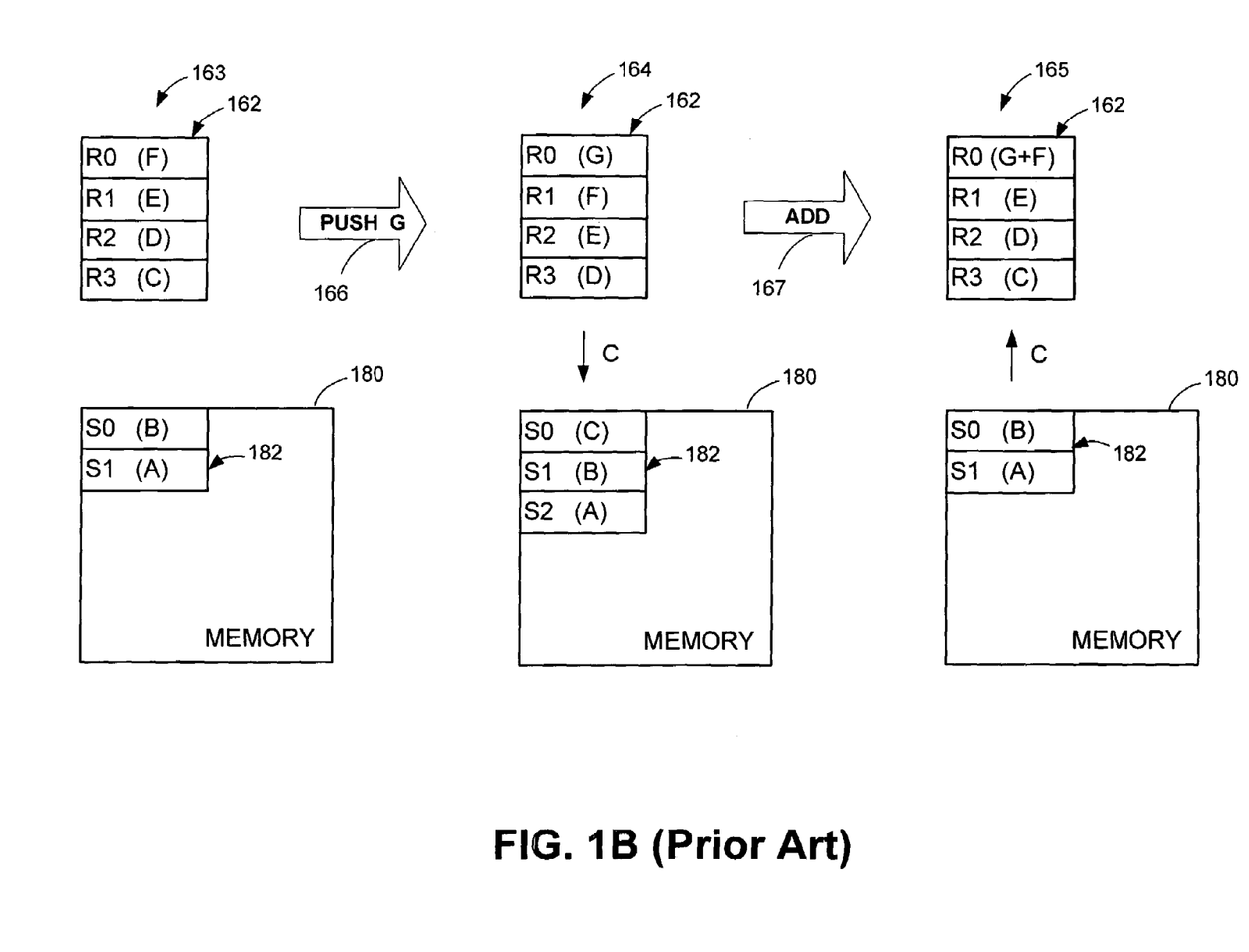
FIG. 1B is a block diagram illustrating certain registers used to emulate a portion of a stack memory, in accordance with an approach known in the prior art.

Reference is now made to FIG. 1B, which illustrates the operation of the stack emulation registers 162, in conjunction with a conventional stack located in a memory 180. In the example illustrated in FIG. 1B, it is assumed that there are four registers (R0-R3) that are dedicated to handling stack data items. In this regard, these registers emulate the top four stack positions of a memory stack. Also illustrated is a memory 180, having a portion 182 thereof configurable for handling a plurality of stack data items. The portion 182 of the memory 180 for implementing a plurality of stack locations, may be dynamically configured to grow as required for handling additional stack data items.

The diagram of FIG. 1B illustrates the stack emulation registers 162 and memory 180 in three successive instances of time (denoted by reference numerals 163, 164, and 165). In the first time instance 163, the stack emulation registers 162 contain values generally denoted as F, E, D, and C. It should be noted that the "values" contained in these individual registers are denoted by letters, as the actual content (or numerical value) of these items is irrelevant to the illustration made herein. The stack portion 182 of the memory 180 contains two values (B and A), stored in stack locations S0 and S1, respectively. By way of convention, register R0 denotes the top of stack position among the four stack emulation registers 162. Likewise, stack location S0 denotes the top of stack location within the memory 180, and as additional stack locations are required, they are added and denoted as S1, S2, and so on. Therefore, in the instant of time denoted as 163, "A" is the oldest value (or first value) saved into the stack. As each successive value (B, C, and so on) was pushed to the stack, the value of A was continually pushed down deeper into the stack. For example, when the contents of A were first pushed to the stack, it would have been pushed into stack emulation register R0. No valid stack data items would have been contained in registers R1, R2, or R3, nor would any valid stack data items have existed in the memory 180 at that time.

Time sequence denoted by reference numeral 164 illustrates the impact that a PUSH G operation 166 has to the stack emulation registers and the relevant portion 182 of the memory stack. Since the stack emulation registers 162 are each occupied with the valid stack data item, the oldest item (C in this example) is moved from the stack emulation registers 162 into the stack portion 182 of the memory 180. In this regard, the value C is moved into the top position of the memory stack. Stack data items D, L, and F, which previously occupied stack emulation registers R2, R1, and R0, respectively, are moved into stack emulation registers R3, R2, and R1, respectively. The new stack data item (G) is then moved into stack emulation register R0 to assume the top position in the stack.

Reference numeral 165 denotes the contents of the stack emulation registers and stack portion 182 in response to an ADD operation 167. As is known, an ADD operation is carried out by adding the values of the top two stack locations, and saving the result in the top location of the stack. Therefore, in response to an ADD operation 167, stack emulation register R0 then contains the contents of G+F. This, in turn, opens stack emulation register R1 (i.e., makes it available to hold new data). Consequently, the contents of the stack below register R1 is shifted upwardly. Thus, registers R2 and R3 are shifted into registers R1 and R2, respectively. Likewise, the top position of the stack portion 182 of the memory stack 180 is shifted into stack emulation register R3. Each successive stack data item within the stack portion 182 of the memory 180 is upwardly shifted as well.

It should be appreciated that the stack emulation registers and stack portion 182 of the memory effectively combine to comprise a dynamic stack. However, the shifting of data among stack emulation registers and the constant moving of data between the stack emulation registers 162 and memory 180 (once the stack emulation registers are full), results in excessive processor bandwidth utilization and undesirable power consumption by the reads and writes to memory 180.

Figure 2:
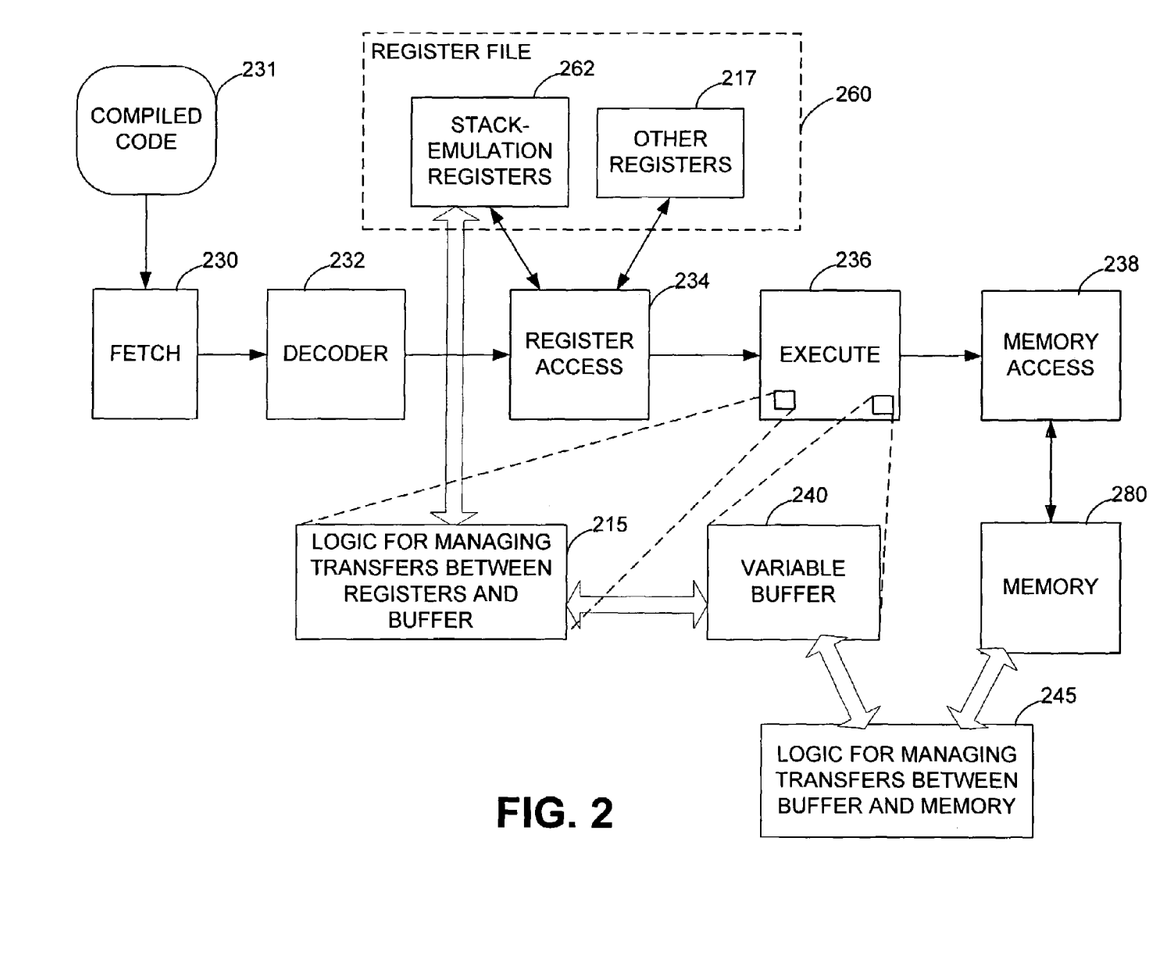
FIG. 2 is a block diagram similar to FIG. 1A, but illustrating a pipelined processor constructed in accordance with one embodiment of the invention.

Reference is now made to FIG. 2, which is a block diagram, similar to the diagram of FIG. 1A, illustrating one embodiment of the invention. The embodiment of FIG. 2 is illustrated in connection with conventional pipeline stages or units, such as a fetch unit 230, a decoder 232, register access unit 234, an execute stage 236, and memory access stage 238. It should be appreciated, however, that the invention may be implemented in architectures other than conventional pipeline architectures. FIG. 2 also illustrates compiled code 231 that is retrieved by the fetching unit 230, where it begins its processing through pipeline stages. Typically, the compiled code 231 is written and compiled for execution on a particular hardware architecture. In the context of the preferred embodiment, such a hardware architecture includes the architecture of a stack-based processor. The inventive features described herein operate on this code, such that the compiled code 231 is compiled independent of this specific architecture of the present invention.

As described in FIG. 1A, a register file 160 typically comprises a portion of a register based processor. Such a register file 260 is illustrated in the preferred embodiment of FIG. 2 as well. The registers contained within the register file 260 include stack-emulation registers 262 and other registers 217 that are conventional to register files 260. In one embodiment, which will be further illustrated herein, there are four stack emulation registers 262. However, consistent with the scope and spirit of the present invention, additional or fewer registers may be dedicated to perform the stack emulation function of these registers.

A central feature of the preferred embodiment includes the utilization of a variable buffer 240 that is interposed between the stack emulation registers 262 and memory 280. As described in connection with the prior art of FIG. 1B, the stack emulation registers 162 and stack portion 182 of the memory 180 cooperate to collectively define a memory stack. In like fashion, the stack emulation registers 262; and stack portion of the memory 280 likewise combine to form a working stack of the system of FIG. 2. In addition, however, the variable buffer 240 provides a plurality of stack locations for additional stack data items. The management of the stack data items between the stack emulation registers 262 and stack portion of the memory 280 through the variable buffer 240 provides improved system performance and lower power consumption than in prior art systems. To this end, one embodiment of the invention further includes logic 215 for managing transfers of stack data items between the stack emulation registers 262 in the variable buffer 240. Likewise, logic 245 may be provided for managing transfers of stack data items between the variable buffer 240 and stack portion of the memory 280. In the illustrated embodiment, the variable buffer 240 and logic 215 are illustrated as being part of execute unit 236, while logic 245 is illustrated as being separate. In another embodiment (not specifically illustrated), the variable buffer 240, logic 215, and logic 245 are all implemented as a part of the execute unit 236. In other embodiments, not specifically illustrated, these elements may be implemented in other areas of the processor pipeline. Further still, these components may be implemented in non-pipelined architectures as well.

In one embodiment, the variable buffer 240 is sized to store eight stack data items. The term variable is used to describe the buffer 240, in that the number of stack data items contained within the buffer at any given time may vary depending upon whether data is being pushed to the stack, or popped therefrom. In this regard, the variable buffer 240 is configured to recognize, or take advantage of, the temporal location of elements in a JAVA stack. In this regard, code written or compiled for stack-based architectures, such as JAVA, is written so that frequent reference is made to data adjacently located in the stack. For example, an ADD instruction merely sums the top two values contained on the stack and stores the resulting value in the top location of the stack. As noted in connection with FIG. 1B, however, once the stack emulation registers are full, continued operations result in the excessive movement of data between stack emulation registers and memory, thereby resulting in an undesirably excessive number of memory accesses. Such excessive memory accesses result in excessive power consumption by the memory, which is particularly undesirable in portable electronic devices, such as cell phones, PDAs (personal digital assistants), or other battery operated devices.

Therefore, a preferred embodiment of the invention uses a variable buffer 240 sized to hold eight stack data items. Stack data items, however, are not pushed from the variable buffer to the stack portion of the memory 280 until the variables buffer 240 is full (or has exceeded a certain threshold value). The logic 245 also operates to manage the buffer 240 such that stack data items are not popped from the stack portion of the memory 280 and transferred to the variable buffer 240 unless four (or other predetermined amount) or fewer stack data items presently exist in the variable buffer 240. Such a relatively small size for the variable buffer, allows for it to be implemented without consuming a significant amount of silicon space, while at the same time providing significantly improved performance (particularly in the form of reduced power consumption) over prior art systems.

It should be appreciated that the "logic for managing transfers" (both 215 and 245) will preferably manage addresses of data, such that standard compiled code 231 may assume normal stack management (beyond stack registers). This addressing, however, may be modified by the logic 215 and 245 to translate addresses into register identifiers and/or modified addresses (based on offset of stack data items stored in buffer).

Figure 3:
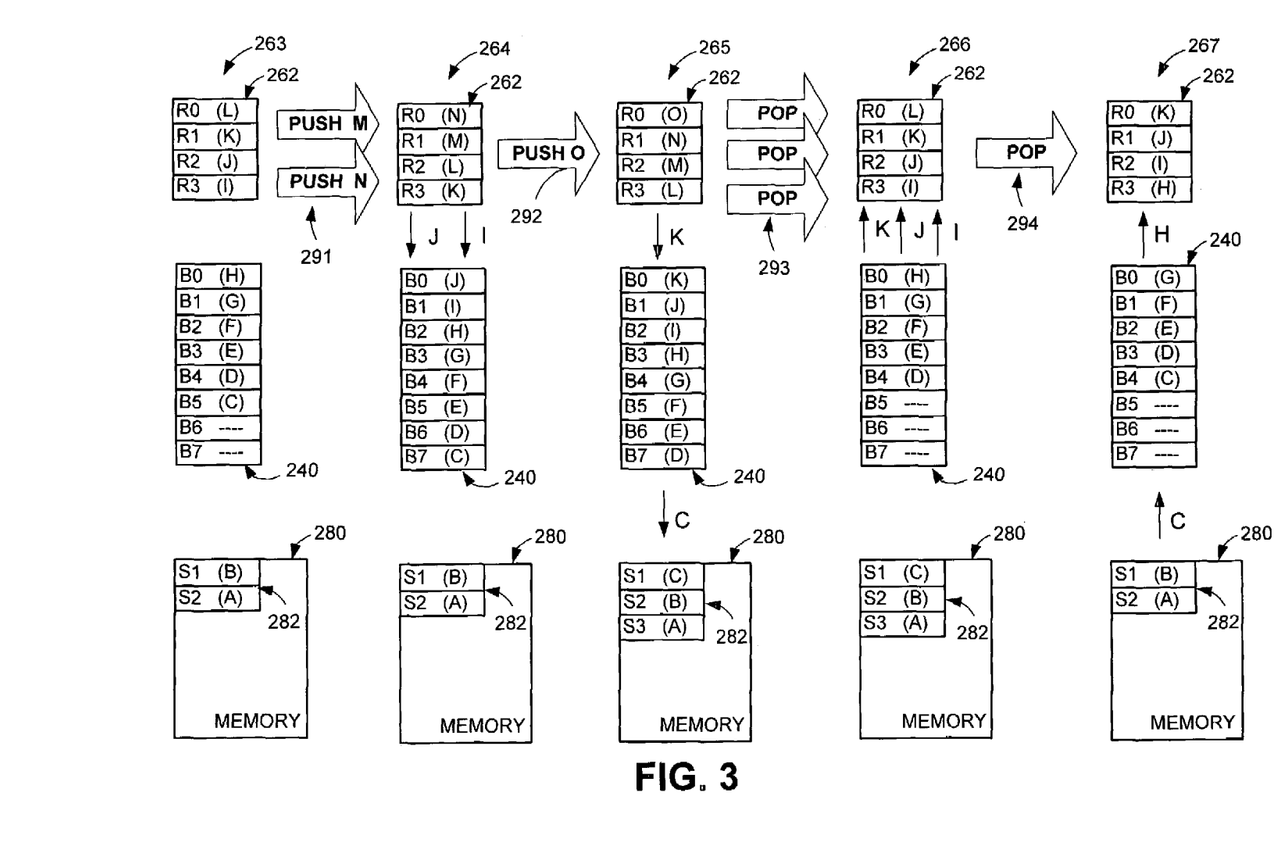
FIG. 3 is a diagram similar to FIG. 1B, illustrating the operation of one embodiment of the invention.

To illustrate the operation of an embodiment, reference is now made to FIG. 3. FIG. 3 is a diagram similar to FIG. 1B, in that it shows the stack contents among the stack emulation registers 262, variable buffer 240, and stack portion 282 of the memory 280 at various, successive, instances of time (denoted by reference numerals 263, 264, 265, 266, and 267). In a first time instance 263, a purely hypothetical condition is illustrated in which the stack portion 282 of the memory 280 contains data items A and B, buffer storage locations B5 through B0 contain stack data items C, D, E, F, G, and H, stack emulation registers 262 contain stack data items I, J, K, and L. In this configuration, stack data item L resides at the top of the stack, while stack data item A resides at the bottom of the stack (i.e., the oldest element on the stack). As can be seen, at the time instance 263, the bottom two locations B6 and B7 of the variable buffer 240 are available (or not used by valid stack data). If two successive PUSH operations 291 (PUSH M and PUSH N) are executed, then the collective stack would appear as illustrated in the time instance denoted by reference numeral 264.

In this regard, stack data items M and N will have been pushed to the top of the stack and reside in stack emulation registers 262, while the remaining contents of the stack would have been pushed downward. Since, however, there were two open or unused locations in the variable buffer, then the oldest stack data items (C and D) contained in the variable buffer 240 will have been shifted (effectively) down to the bottom two registers B7 and B6 of the variable buffer 240 with the remaining contents of the variable buffer shifted appropriately downward. Data items I and J, which had been previously stored in registers R3 and R2 of the stack emulation registers 262 are transferred into the top two locations B1 and B0 of the variable buffer 240. Significantly, however, two items (M and N) have been pushed to the stack, and yet no writes have taken place to memory 280, thereby conserving power otherwise consumed in memory transfers to the memory 280.

The operation of the embodiment depicted in FIG. 3 has been illustrated to operate as though stack data items are moved by shifting them through the stack emulation registers and the buffer locations. However, it will be appreciated that the data (in practice) may actually be effectively moved or shifted by using pointers to point to the data, and merely updating the values of the pointers, rather than actually moving data from register to register, or location to location. The management of such pointers may be implemented in a variety of ways. One example is described in co-pending application Ser. No. 10/827,662, filed on Apr. 19, 2004, the contents of which are hereby incorporated by reference.

At this point, however, since the variable buffer 240 is full, a subsequent PUSH 292 will result in the stack data being effectively rippled through the stack emulation registers 262 and variable buffer 240, with a stack data item C being written to memory 280. This is illustrated by reference number 265, showing the condition of the stack after a PUSH O operation 292. In this regard, the data contents of O are pushed to the top of the stack (into register R0 of the stack emulation registers). Prior to transferring the data O into that register, however, data must be moved throughout the remainder of the stack to make space available for that data item. This results in the data value C being transferred from the bottom of the variable buffer 240 into the top location of the stack portion 282 of the memory 280. As illustrated, the stack portion 282 may freely expand or grow into the memory 280 as any conventional stack. Stack data item K is transferred from the R3 position of the stack emulation registers into the B0 position of the variable buffer, while the remaining contents of the variable buffer locations are shifted down accordingly.

Now assume three successive POP operations 293 are performed. The top three items are popped from the stack emulation registers 262, which comprise the top of the stack. The data in the stack emulation registers and variable buffer 240 are then upwardly shifted (effectively) to move into those stack locations. This results in data items K, J, and I being transferred from the variable buffer 240 into the stack emulation registers R1, R2, and R3. As a result, the three bottom locations of the variable buffer 240 (B5, B6, and B7) are unused.

As mentioned above, in the preferred embodiment, so long as more than four items reside in the variable buffer 240, then stack contents from the stack portion 282 of the memory 280 are not communicated to the variable buffer 240. Therefore, stack data items C, B, and A remain in stack locations S1, S2, and S3, respectively. If, however, another POP operation 294 is performed, then data item L is moved from the R0 position of the stack emulation registers and the contents K, J, and I of registers R1, R2, and R3 are shifted upwardly. The top contents H of the variable buffer 240 is then transferred into the R3 location of the stack emulation register 262. This results in only four stack data items residing in the variable buffer 240. These four items are G, F, E, and D. Since there are now four items in the variable buffer, in accordance with one embodiment, the top stack data item C is retrieved from the stack portion 282 of the memory 280 and is moved into the B4 location of the variable buffer 240.

It should be appreciated that the operation illustrated in the diagram of FIG. 3 is merely one embodiment of a number of embodiments that may be implemented consistent with the scope and spirit of the invention. For example, rather than communicating data between the variable buffer 240 and memory 280, one item (e.g., byte or word) at a time, data may be communicated between the buffer 240 and memory 280 in bursts. In this regard, two, four, or even more data items may be communicated at a time. In addition, the variable buffer 240 may be a different size than that illustrated in FIG. 3. As one example, the variable buffer 240 could be sized to hold sixteen stack data items. Further, the logic 245 (FIG. 2) could be configured such that once twelve or more items were stored in the buffer, upon receiving a PUSH operation, a burst of four stack data items could be communicated to the stack portion 282 of the memory 280. Conversely, upon fewer than four data items being present in the buffer 240, and in response to a POP operation, a burst of four stack data items may be read from the stack portion 282 of the memory 280 into four available locations within the buffer 240.

In addition, it should be noted that transfers between the buffer 240 and memory 280 are preferably made at times outside a critical path. That is, when data is pushed or popped to or from the stack by the processor, it is important for that initial transaction (e.g., data being transacted out of the processor pipeline to the stack or from the stack into the processor pipeline) to be done as quickly as possible so that pipelined operations can continue. As can be readily observed by reference to FIG. 2, data transactions between the variable buffer 240 and memory 280 may occur at other times as transactions between these two devices do not interrupt the flow of data through the pipeline.

Figure 4:
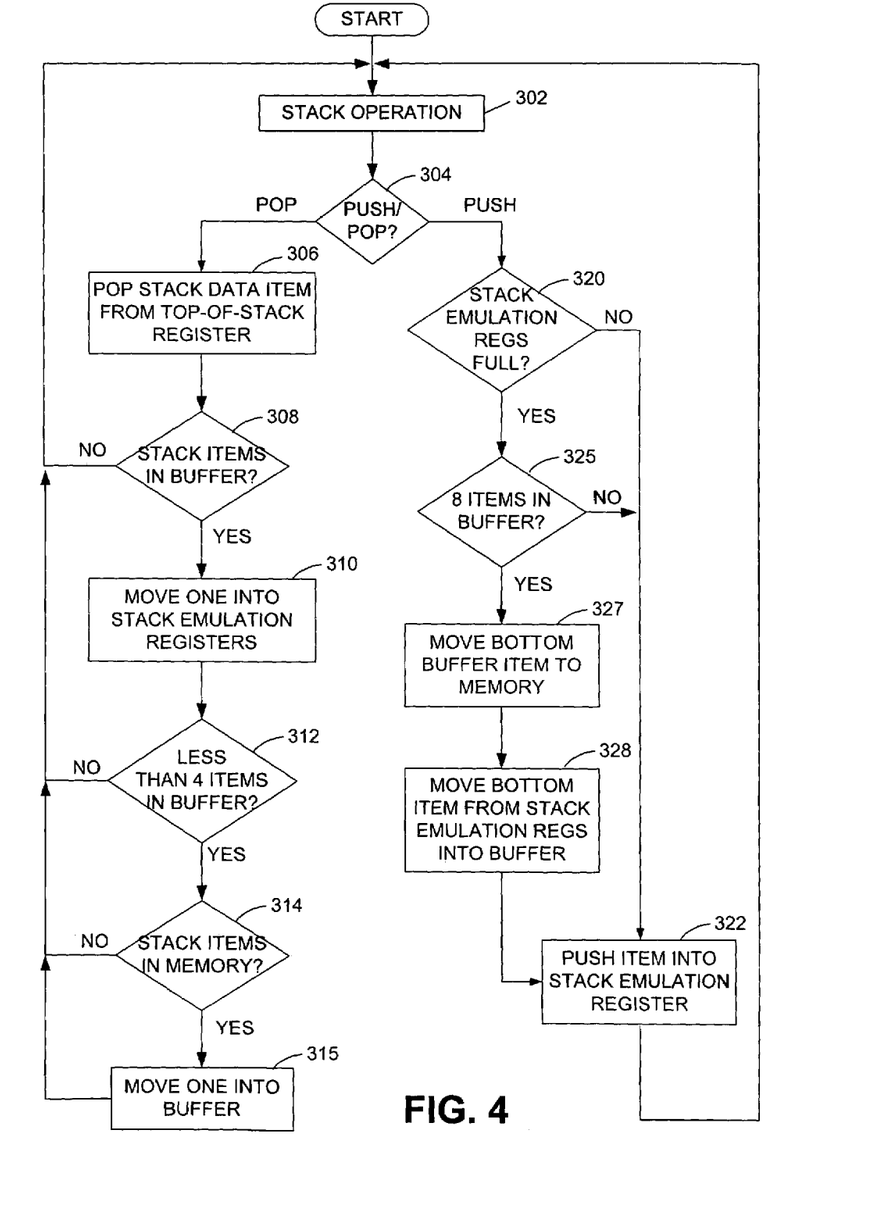
FIG. 4 is a flowchart illustrating the top-level functional operation of one embodiment of the invention.

Reference is now made to FIG. 4, which is a flowchart illustrating the top-level operation of one embodiment of the present invention. In response to a stack operation 302, a method may determine whether the stack operation involves a PUSH of data to the stack or a POP of data from the stack (304). If the operation involves popping data from the stack, the embodiment may immediately POP or pull a stack data item from the top of stack register R0, which is the top position of the memory stack (step 306). Immediately following step 306, the contents of the remaining stack emulation registers may be shifted upward one location each. Thereafter, the operation may proceed by determining whether there are stack data items present in the buffer 240 (step 308). If not, then no further operation need be performed. If, however, there are stack data items in the buffer 240, then the top-most item in the buffer 240 is preferably moved into the available stack emulation register R3 (step 310). This allows maximum utilization of the stack emulation registers by preferably keeping them as full as possible at all times. Next, the operation proceeds to optimize the number of stack data items maintained within the buffer 240. In this regard, in one embodiment, if there are less than four items in the buffer 240, then any available stack data items present in the stack portion of the memory may be moved into the buffer 240. Therefore, the method determines whether there are fewer than four stack data items in the buffer (312). If not, no further steps need to be taken. If there are, however, fewer than five items in the buffer, then the method determines whether there are stack data items presently in the stack portion 282 of the memory 280 (step 314). If so, then one (or more) stack data item from the memory 280 is moved into the buffer 240 (step 315).

If the evaluation of step 304 determines that the stack operation is a PUSH operation, then a stack item is, of course, pushed into the stack. Before pushing an item into the stack emulation registers, however, room must first be made for that item (if the stack emulation registers are full). Thus, in one embodiment, the method may make a determination as to whether the stack emulation registers are all full (step 320). If not, the method immediately PUSHes the new stack item into a top of stack location in the stack emulation registers (step 322). Of course, the data contents of the remaining stack emulation registers will be manipulated in such a way that the data item pushed into the top of stack location does not overwrite otherwise valid data. If, however, step 320 determines that the stack emulation registers are completely occupied with valid stack data, then a stack item from the bottom location of the stack emulation registers is moved into the variable buffer 240 to make space for the new data item to be pushed into the stack emulation registers. Before moving data from the stack emulation registers into the buffer 240, however, the method first determines whether there is space available in the buffer 240. In this regard, the method may evaluate to determine whether the buffer is full (i.e., whether there are eight items currently stored in the buffer 240) (step 325). If not, then an item in the bottom location of the stack emulation registers may be immediately moved into an available location of the variable buffer 240 (not specifically shown).

In this regard, consistent with an embodiment illustrated in FIG. 3, any items existing in the variable buffer 240 may be shifted downward one location to make space available in the top-most location of the buffer 240 for receiving the data item communicated from the stack emulation register R3. If step 325 determines that the variable buffer is, in fact, full, then the bottom-most buffer item may be moved into the stack portion 282 of memory 280 (step 327). After moving this data item into memory, the remaining data items in the buffer may be shifted to make space available for the data item to be moved from the stack emulation register into the buffer 240. Thereafter, the data item in register R3 may be moved into buffer location B0 of the variable buffer (step 328). Thereafter, having made space available in the stack emulation registers for the new data, the new data should be pushed to the stack may be pushed into the stack emulation registers (step 322).

Although the foregoing embodiments generally described embodiments that contemplate the effective shifting of stack data either downward or upward in a stack as new stack data items are pushed to the stack or popped therefrom, respectively. It should be appreciated that consistent with the scope and spirit of the invention other alternatives may be implemented. For example, rather than shifting stack data among the various registers in the stack emulation registers, or shifting stack data among the various locations in the variable buffer 240, pointers may be used to merely point to successive locations indicating uppermost (or lowermost) stack locations. Such an implementation would certainly be time efficient by avoiding unnecessary data movement among registers or other data locations. In this regard, the embodiment illustrated in FIG. 3 and described herein has been presented merely to facilitate an appreciation of certain benefits, obtained from an embodiment of the invention, that are achieved by the utilization of the variable buffer 240.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A processor comprising:
a plurality of registers configured to emulate a top portion of a memory stack;
a buffer configured to emulate a second portion of the memory stack;
first logic configured to manage transfers between the plurality of registers and the buffer; and
second logic configured to manage transfers between the buffer and a memory, whereby data is not transferred from the buffer to memory when a number of valid stack items in the buffer is less than a first predetermined number, and data is not transferred from memory to the buffer when the number of valid stack data items in the buffer exceeds a second predetermined number, wherein the first predetermined number and the second predetermined number are equal to or less than the size of the buffer.

2. The processor of claim 1, wherein the first logic is configured to manage transfers so as to maximize usage of the plurality of registers, whereby data is transferred from the buffer to registers of the plurality of registers if any of the plurality of registers does not contain valid stack data and the buffer contains at least one valid stack data item.

3. The processor of claim 1, wherein the second logic is configured to manage transfers so as to reduce data transfers with the memory, whereby data is transferred from the buffer to memory when the number of valid stack data items in the buffer exceeds the first predetermined number, and data is transferred from memory to the buffer when the number of valid stack data items in the buffer is less than the second predetermined number and there are valid stack data items in memory, wherein the second predetermined number is smaller than the first predetermined number.

4. The processor of claim 3, wherein the first predetermined number is eight and the second predetermined number is four.

5. A system comprising:
a processor and a memory;
emulation logic configured to emulate a top portion of a memory stack with a plurality of registers of the processor;
a buffer configured to emulate a second portion of the memory stack;
transfer logic for managing data transfers between the plurality of registers and a portion of the memory configured to store a remainder of the memory stack, whereby the transfer logic stores a variable number of stack data items in the buffer, and whereby data is not transferred from the buffer to memory when a number of valid stack items in the buffer is less than a first predetermined number, and data is not transferred from memory to the buffer when the number of valid stack data items in the buffer exceeds a second predetermined number, wherein the first predetermined number and the second predetermined number are equal to or less than the size of the buffer.

6. The system of claim 5, wherein, in response to a PUSH operation, the transfer logic operates to transfer a stack data item from the buffer to the memory, if more than the first predetermined number of stack data items are currently held in the buffer.

7. The system of claim 6, wherein the transfer logic transfers a stack data item from a processor register to the buffer, in response to the PUSH operation.

8. The system of claim 6, wherein the transfer logic transfers a stack data item from one of the plurality of processor registers to the buffer, in response to the PUSH operation, only if each of the plurality of registers is utilized with valid stack data items.

9. The system of claim 8, wherein the transfer logic transfers the stack data from the processor register to the buffer before moving a new stack data item into the processor register.

10. The system of claim 5, wherein, in response to a POP operation, the transfer logic operates to transfer a stack data item from the memory to the buffer, if fewer than the second predetermined number of stack data items are currently held in the buffer.

11. The system of claim 10, wherein the transfer logic transfers a stack data item from the buffer to one of the plurality of processor registers, in response to the POP operation, only if at least one valid stack data item is in the buffer.

12. The system of claim 11, wherein the transfer logic transfers the stack data from the buffer to the processor register before moving a new stack data item into the buffer from the memory.

13. A method for managing stack transfers between a memory and a processor comprising:
emulating a top portion of a memory stack within a plurality of processor registers; and
implementing a variable-depth buffer configured to emulate a second portion of the memory stack to manage transfers between the plurality of processor registers and the memory, whereby data is not transferred from the buffer to memory when a number of valid stack items in the buffer is less than a first predetermined number, and data is not transferred from memory to the buffer when the number of valid stack data items in the buffer exceeds a second predetermined number, wherein the first predetermined number and the second predetermined amount are equal to or less than the size of the buffer.

14. The method of claim 13, further comprising, in response to a PUSH operation, transferring a stack data item from the variable-depth buffer to the memory, if a number of stack data items in the variable-depth buffer exceeds the first predetermined value, and transferring a stack data item from a register of the plurality of registers to the variable-depth buffer.

15. The method of claim 14, where the first predetermined number is eight.

16. The method of claim 13, further comprising, in response to a POP operation, transferring a stack data item from the variable-depth buffer to a register of the plurality of registers, and transferring a stack data item from the memory to the variable-depth buffer if the number of stack data items in the variable-depth buffer is fewer than the second predetermined number.

17. The method of claim 16, where the second predetermined number is four.

18. A method for processing a PUSH operation comprising:
   emulating a top portion of a memory stack using a plurality of processor registers;
   transferring contents of an intermediate memory buffer configured to emulate a second portion of the memory stack to a stack location in memory, if a number of stack data items in the intermediate memory buffer exceeds a predetermined amount, wherein the predetermined amount is equal to or less than the size of the buffer;
   transferring contents of one of the plurality of processor registers to the intermediate memory buffer; and
   moving a value to be pushed onto a stack, in response to the PUSH operation, to one of the plurality of registers not having a valid stack data item.

19. The method of claim 18, further including considering a processor register to contain an invalid stack data item upon transfer of the stack data from the processor register to the intermediate buffer.

20. A method for processing a POP operation comprising:
   emulating a top portion of a memory stack using a plurality of processor registers;
   emulating a second portion of the memory stack using an intermediate memory buffer;
   moving a value to be popped from the memory stack from one of the plurality of registers, in response to the POP operation;
   transferring contents of an intermediate memory buffer to the processor register from which the value was moved in response to the POP operation; and
   transferring contents from a stack location in memory to a location in the intermediate memory buffer, if a number of stack data items in the intermediate memory buffer is less than a predetermined amount, wherein the predetermined amount is equal to or less than the size of the buffer.

* * * * *